(12) United States Patent
Slothower et al.

(10) Patent No.: US 8,384,674 B1
(45) Date of Patent: Feb. 26, 2013

(54) INTEGRATED ENCLOSURE/TOUCH SCREEN ASSEMBLY

(75) Inventors: Anna Pia Slothower, Belmont, CA (US); David Northway, San Carlos, CA (US); William Robert Hanson, Mountain View, CA (US); Lawrence Lam, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1630 days.

(21) Appl. No.: 09/774,990

(22) Filed: Jan. 30, 2001

(51) Int. Cl.
*G09G 5/00* (2006.01)

(52) U.S. Cl. ........ 345/173; 345/156; 345/169; 455/566; 455/575

(58) Field of Classification Search .................. 345/156, 345/157, 173–183, 905, 169; 178/18, 19, 178/18.01–18.09; 455/566, 575, 556.2
See application file for complete search history.

(56) References Cited

U.S. PATENT DOCUMENTS

| | | | |
|---|---|---|---|
| 4,429,478 A | 2/1984 | Bruce-Sanders | |
| 4,659,873 A | 4/1987 | Gibson et al. | |
| 5,130,500 A | 7/1992 | Murakami et al. | |
| 5,233,502 A | 8/1993 | Beatty et al. | |
| 5,357,061 A * | 10/1994 | Crutchfield | 178/18.08 |
| 5,510,813 A | 4/1996 | Makinwa et al. | |
| 5,534,888 A | 7/1996 | Lebby et al. | |
| 5,554,828 A * | 9/1996 | Primm | 178/18 |
| 5,579,036 A | 11/1996 | Yates, IV | |
| 5,634,080 A | 5/1997 | Kikinis et al. | |
| 5,641,219 A | 6/1997 | Mizobe | |
| 5,696,982 A | 12/1997 | Tanigawa et al. | |
| 5,764,322 A | 6/1998 | Mamiya et al. | |
| 5,785,439 A | 7/1998 | Bowen | |
| 5,786,665 A | 7/1998 | Ohtsuki et al. | |
| 5,838,309 A * | 11/1998 | Robsky et al. | 345/173 |
| 5,854,625 A | 12/1998 | Frisch et al. | |

(Continued)

FOREIGN PATENT DOCUMENTS

| | | |
|---|---|---|
| EP | 0668569 A2 | 8/1995 |
| EP | 898223 | 2/1999 |

(Continued)

*Primary Examiner* — Quan-Zhen Wang
*Assistant Examiner* — Jennifer Nguyen

(57) ABSTRACT

An integrated enclosure/touch screen assembly with a soft thermoplastic outer surface coupled directly to a digitizer mechanism. A touch screen assembly consisting of a display mechanism and a resistive digitizer mechanism are enclosed within a single piece cover. The digitizer mechanism consists of a top film and a digitizing element, and the single piece cover is affixed directly to the top film of the digitizer mechanism. The single piece cover has a flat outer surface that is free of any steps or indentations which provides an enclosure that is both dust free and waterproof. The soft thermoplastic material used for the single piece cover will allow activation of the digitizer mechanism by means of mechanical pressure applied to the outer surface of the single piece cover. In one embodiment, the single piece cover is constructed by coupling a soft thermoplastic outer film directly to the top film of the digitizer mechanism by an in mold decoration process. This process forms the flat outer surface for the single piece cover and also may be used to provide various shapes for the outer edges of the cover. In a second embodiment, a touch screen assembly consisting of a display mechanism and a digitizer mechanism are enclosed within a mechanical support mechanism. A soft thermoplastic film is then coupled directly to the top film of the digitizer mechanism and the support mechanism to form a flat outer surface for the entire enclosure that is free of any steps or indentations.

5 Claims, 6 Drawing Sheets

U.S. PATENT DOCUMENTS

| | | | |
|---|---|---|---|
| 5,907,375 | A | 5/1999 | Nishikawa et al. |
| 5,949,643 | A | 9/1999 | Batio |
| 5,995,084 | A * | 11/1999 | Chan et al. .................. 345/173 |
| 6,017,584 | A | 1/2000 | Albert et al. |
| D425,036 | S | 5/2000 | Copus et al. |
| 6,057,814 | A | 5/2000 | Kalt |
| 6,067,074 | A | 5/2000 | Lueders |
| 6,068,381 | A | 5/2000 | Ayres |
| 6,069,593 | A | 5/2000 | Lebby et al. |
| 6,108,195 | A | 8/2000 | Behl et al. |
| 6,118,426 | A | 9/2000 | Albert et al. |
| 6,144,358 | A | 11/2000 | Narayanaswamy et al. |
| 6,163,313 | A * | 12/2000 | Aroyan et al. ................ 345/173 |
| 6,181,842 | B1 | 1/2001 | Francis et al. |
| 6,191,833 | B1 | 2/2001 | Hirakata |
| 6,210,771 | B1 | 4/2001 | Post et al. |
| 6,215,476 | B1 * | 4/2001 | Depew et al. ................. 345/173 |
| 6,229,502 | B1 | 5/2001 | Schwab |
| 6,252,564 | B1 | 6/2001 | Albert et al. |
| 6,256,009 | B1 | 7/2001 | Lui et al. |
| 6,262,717 | B1 * | 7/2001 | Donohue et al. ............. 345/173 |
| 6,266,473 | B1 | 7/2001 | Saccomanno et al. |
| 6,295,403 | B1 | 9/2001 | Takeuchi et al. |
| 6,297,945 | B1 | 10/2001 | Yamamoto |
| 6,304,763 | B1 | 10/2001 | Jahagirdar et al. |
| 6,309,081 | B1 | 10/2001 | Furihata |
| 6,311,076 | B1 | 10/2001 | Peuhu et al. |
| 6,326,613 | B1 | 12/2001 | Heslin et al. |
| 6,327,482 | B1 | 12/2001 | Miyashita |
| 6,330,386 | B1 | 12/2001 | Wagner et al. |
| 6,333,736 | B1 | 12/2001 | Sandbach |
| 6,340,957 | B1 | 1/2002 | Adler et al. |
| 6,341,872 | B1 | 1/2002 | Goto |
| 6,343,006 | B1 | 1/2002 | Moscovitch et al. |
| 6,343,519 | B1 | 2/2002 | Callicott et al. |
| 6,347,873 | B1 | 2/2002 | Hosseini et al. |
| 6,352,350 | B1 | 3/2002 | Ma |
| 6,367,934 | B1 | 4/2002 | Salesky et al. |
| 6,377,228 | B1 | 4/2002 | Jenkin et al. |
| 6,377,324 | B1 | 4/2002 | Katsura |
| 6,392,786 | B1 | 5/2002 | Albert |
| 6,400,376 | B1 | 6/2002 | Singh et al. |
| 6,415,138 | B2 | 7/2002 | Sirola et al. |
| 6,424,403 | B1 | 7/2002 | Leenhouts et al. |
| 6,437,900 | B1 | 8/2002 | Cornelissen et al. |
| 6,456,279 | B1 | 9/2002 | Kubo et al. |
| 6,466,202 | B1 | 10/2002 | Suso et al. |
| 6,466,292 | B1 | 10/2002 | Kim |
| 6,483,498 | B1 | 11/2002 | Colgen et al. |
| 6,485,157 | B2 | 11/2002 | Ohkawa |
| 6,492,979 | B1 | 12/2002 | Kent et al. |
| 6,536,909 | B1 | 3/2003 | Azorin |
| 6,556,189 | B1 * | 4/2003 | Takahata et al. .............. 345/173 |
| 6,565,189 | B2 | 5/2003 | Yamada et al. |
| 6,576,887 | B2 | 6/2003 | Whitney et al. |
| 6,577,496 | B2 | 6/2003 | Gioscia et al. |
| 6,601,961 | B1 | 8/2003 | Masaki |
| 6,607,297 | B2 | 8/2003 | Egawa |
| 6,630,928 | B1 | 10/2003 | McIntyre et al. |
| 6,662,244 | B1 | 12/2003 | Takahashi |
| 6,697,135 | B1 | 2/2004 | Baek et al. |
| 6,700,557 | B1 | 3/2004 | McKnight |
| 6,865,076 | B2 | 3/2005 | Lunsford |
| 6,950,087 | B2 | 9/2005 | Knox et al. |
| 6,955,198 | B2 | 10/2005 | Wodjenski |
| 6,965,375 | B1 | 11/2005 | Gettemy et al. |
| 6,992,659 | B2 | 1/2006 | Gettemy |
| 7,046,282 | B1 | 5/2006 | Zhang et al. |
| 2002/0021258 | A1 | 2/2002 | Koenig |
| 2002/0021622 | A1 | 2/2002 | Baroche |
| 2002/0149571 | A1 | 10/2002 | Roberts |
| 2003/0114200 | A1 | 6/2003 | Lee |
| 2004/0165060 | A1 | 8/2004 | McNelley et al. |

FOREIGN PATENT DOCUMENTS

| | | |
|---|---|---|
| JP | 2003-84142 | 10/2004 |
| WO | 00/59179 | 10/2000 |
| WO | 00/79372 | 12/2000 |
| WO | 01/53919 | 7/2001 |

* cited by examiner

400 a)

b)

INTEGRATED ENCLOSURE/TOUCH SCREEN ASSEMBLY

BACKGROUND OF THE INVENTION

1. Field of the Invention

The present invention relates to the field of portable electronic devices that contain display devices. More particularly, the present invention relates to devices that contain a touch screen assembly that is activated by finger touch or by stylus pressure.

2. Related Art

Digital display devices are found in numerous electronic products such as wrist watches, hand calculators, cell phones and Personal Digital Assistants (PDA). Flat panel touch screen displays are included in certain applications both to present information to the user as well as to accept input data by means of user touch screen commands. Such displays include a digitizer mechanism and a display mechanism. A typical digitizer mechanism consists of a digitizing element having a flexible film supported slightly above the surface of the digitizing element. A pressure applied to the outer surface of the flexible film that causes the film to deflect and contact the digitizing element at a point can be used as an input signal to activate the digitizer mechanism.

The flexible film and the digitizing element must be mounted in a support housing to provide and maintain the proper spacing between the two. At the same time, additional protection against moisture, dust and mechanical damage must be provided for the flexible film used in the digitizer mechanism. Thus, an additional outer protective film mounted above the digitizer flexible film is generally included in the touch screen display assembly. The problem here is the reduction in sensitivity to the external mechanical pressure required to activate the digitizer mechanism. In addition, the added film may increase overall opacity which makes it more difficult to view any display element housed within.

Typically, a touch screen mechanism and a display mechanism are mounted within an enclosure in a recessed fashion. That is, the surface of the additional protective film which actually forms the outermost surface of the digitizer mechanism is on a level below the outer edges of the supporting enclosure which acts as a bezel. The resulting product then has a rim or step-down edge surrounding the touch screen which presents the typical bezel-like appearance. One problem with the bezel design is maintaining a moisture and dust free environment for the touch screen mechanism is made difficult. Such an assembly often does not provide a satisfactory moisture and dust proof enclosure. An additional problem involves the complexity and cost of assembly. Yet another problem involves the overall thickness of the device. The bezel design adds unwanted thickness to the display components.

SUMMARY OF THE INVENTION

Accordingly, the present invention provides a mechanism for enclosing a touch screen assembly within a single piece cover. The cover of the present invention eliminates the unwanted properties of the bezel design.

The single piece cover is constructed from a soft polycarbonate type thermoplastic material that provides a waterproof and dust free environment for the enclosed touch screen assembly. Further, the cover is constructed with a flat surface that is free of any steps or indentations, and may be formed with rounded or otherwise shaped edges. The touch screen assembly consists of a digitizer mechanism and a display mechanism, and the top film of the digitizer mechanism is coupled (e.g., fused, affixed, adhered, etc.) directly to the cover to provide mechanical transfer to the digitizer portions. The soft thermoplastic material of the cover is thin and flexible enough to provide a mechanical transfer system that allows activation of the digitizer mechanism by means of pressure applied to the external surface of the cover. More specifically, external pressure applied either by finger touch or by a stylus is sufficient to activate the digitizer mechanism.

An integrated enclosure/touch screen assembly with a soft thermoplastic outer surface coupled directly to a digitizer mechanism is described. A touch screen assembly consisting of a display mechanism and a resistive digitizer mechanism are enclosed within a single piece cover. The digitizer mechanism consists of a top film and a digitizing element, and the single piece cover is coupled directly to the top film of the digitizer mechanism. The single piece cover has a flat outer surface that is free of any steps or indentations which provides an enclosure that is both dust free and waterproof. The soft thermoplastic material used for the single piece cover will allow activation of the digitizer mechanism by means of mechanical pressure applied to the outer surface of the single piece cover.

In one embodiment, the single piece cover is constructed by coupling a soft thermoplastic outer film directly to the top film of the digitizer mechanism by an in mold decoration process. This process forms the flat outer surface for the single piece cover and also may be used to provide various shapes for the outer edges of the cover. In a second embodiment, a touch screen assembly consisting of a display mechanism and a digitizer mechanism are enclosed within a mechanical support mechanism. A soft thermoplastic film is then coupled directly to the top film of the digitizer mechanism and the support mechanism to form a flat outer surface for the entire enclosure that is free of any steps or indentations.

More specifically, an embodiment of the present invention includes a single piece cover enclosure constructed using in mold decoration. The cover is composed of a soft and flexible thermoplastic material. A touch screen assembly consisting of a digitizer mechanism and a display mechanism is enclosed within the cover to provide a moisture and dust free environment. The digitizer mechanism consists of a resistive digitizer and a top film which is coupled directly to the single piece cover by in mold decoration process. The cover is thin and flexible which establishes a mechanical transfer system that allows activation of the digitizer mechanism by an external pressure applied to the top cover.

An external pressure applied either by finger touch or by a stylus is sufficient to activate the digitizer mechanism. Further, the in mold process allows for the formation of a cover having a completely flat outer surface free of steps or indentations. In mold decoration can also be used to produce single piece covers having edges of many different shapes. The surface of the single piece cover coupled to the top film of the digitizer mechanism can be made quite thin using in mold decoration and the pressure sensitivity of the resulting mechanical transfer system is thereby increased. Further, the thin single piece cover will not appreciably increase the opacity above the digitizing mechanism.

A second embodiment of the present invention provides for enclosing a digitizer mechanism and a display mechanism within a supporting structure and coupling a single piece cover to the support mechanism. The single piece cover is coupled to the support mechanism to form a flat surface free of any steps or indentations. In this fashion, a moisture and dust free environment is formed for the digitizer and display mechanisms. The digitizer mechanism consists of a top film and a resistive digitizing element and the single piece cover is coupled directly to the top film of the digitizer. The single piece cover consists of a soft thermoplastic material that is thin and flexible. Coupling the single piece cover to the top film of the digitizer mechanism establishes a mechanical transfer system that allows activation of the digitizer mechanism by an external pressure applied to the top cover. An external pressure applied either by finger touch or by a stylus is sufficient to activate the digitizer mechanism. This embodiment of the present invention provides a reduction in cost and complexity of construction.

Further, the surface of the single piece cover coupled to the top film of the digitizer mechanism can be made quite thin and the pressure sensitivity of the resulting mechanical transfer system is thereby increased. Finally, the thin single piece cover will not appreciably increase the opacity above the digitizing mechanism.

DETAILED DESCRIPTION OF THE INVENTION

In the following detailed description of the present invention, an integrated enclosure/touch screen assembly, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1:
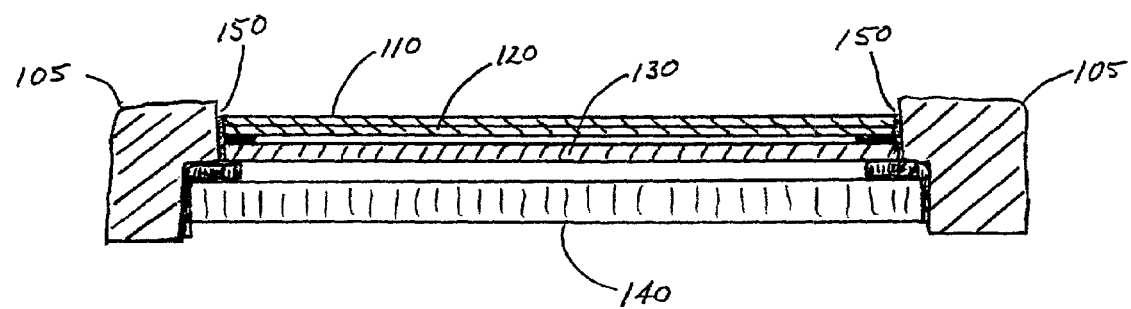
FIG. 1 is a cross-sectional view of an enclosure/touch screen assembly utilized in prior art.

FIG. 1 is a cross-sectional view of an enclosure/touch screen assembly 100 utilized in prior art. The entire assembly is held in place by the supporting structure 105. The outermost protective film 110 provides mechanical protection for the digitizer film 120. In addition, the outermost protective film is coupled to the support mechanism in order to provide a moisture and dust seal. The digitizing element 130 is located below and close to the digitizer film. An externally applied pressure that deflects the protective film will also deflect the digitizer film.

Any applied pressure great enough to cause the digitizer film to contact the digitizing element will then activate the digitizer mechanism. The display element 140 is located below the digitizer mechanism. User information is displayed on the upper surface of the display element. Together, the protective film, the digitizer film and the digitizing element must have an opacity small enough to allow viewing of the information displayed on the display element. The entire touch screen assembly is located within the support structure such that the surface of the outermost protective film is below the upper edge of the support structure. There is therefore a step-down corner 150 from the upper edge of the support structure to the surface of the outermost protective film and the resulting assembly exhibits a bezel like appearance. These step-down corners are dust and moisture collectors, are difficult to clean and frequently do not seal properly.

Figure 2:
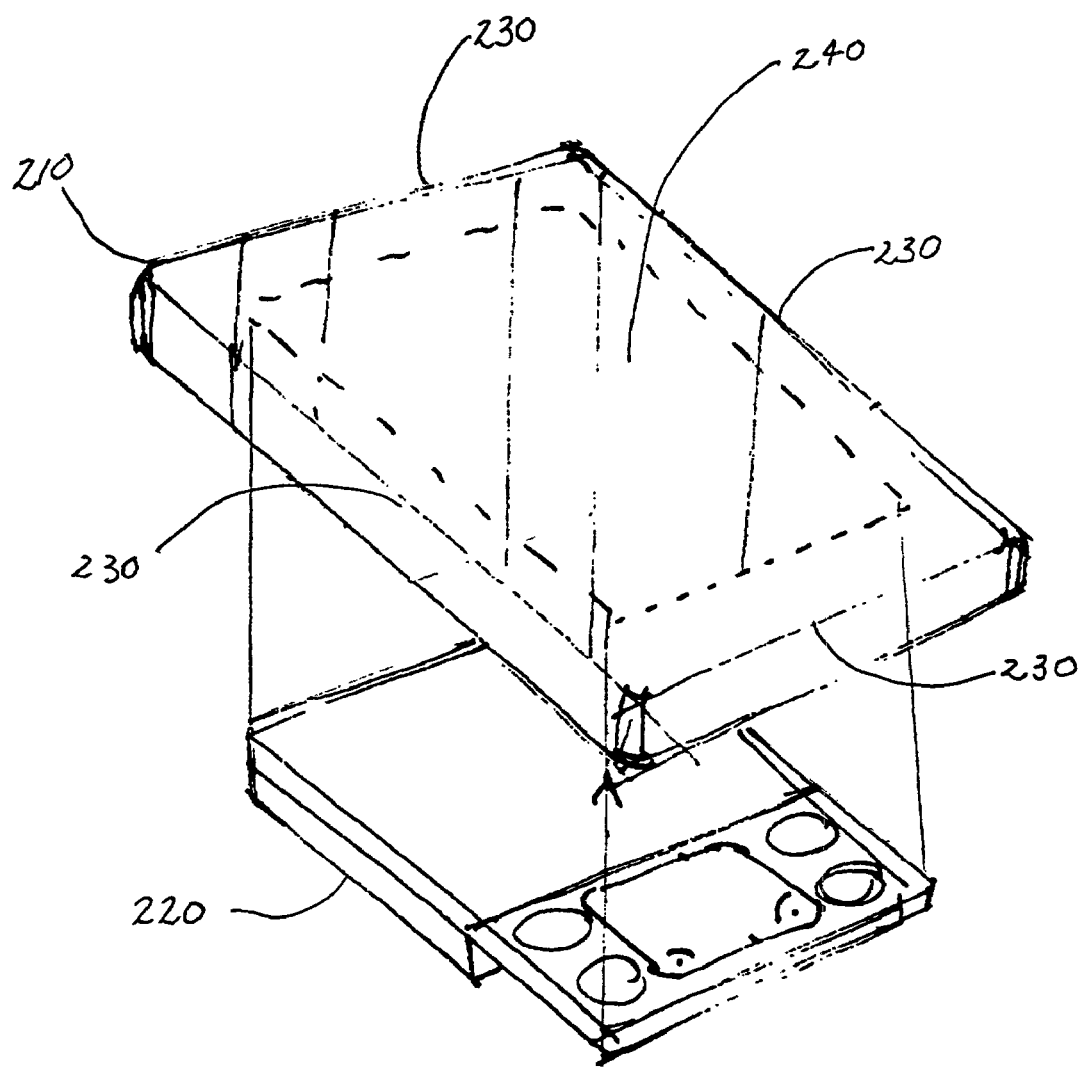
FIG. 2 illustrates an integrated enclosure/touch screen assembly constructed using in mold decoration to form a single cover piece according to an embodiment of the present invention.

FIG. 2 is an embodiment 200 showing an integrated enclosure/touch screen assembly with a single cover piece 210 constructed using in mold decoration in accordance with one embodiment of the present invention. The cover piece consists of a soft thermoplastic polycarbonate material and the upper surface 240 can be made quite thin in order to reduce opacity. The upper surface of the cover piece is flat and has no steps or indentations. The touch screen assembly 220 (having a resistive digitizer) fits entirely within the cover piece and the top surface of the touch screen assembly is then coupled to the inner portion of the upper surface of the cover piece. The cover piece then provides a secure moisture and dust free environment for the enclosed touch screen assembly. Since the cover piece is constructed using an in mold decoration process, the outer edges 230 can also be formed with any desired shape. Shaping of the cover piece can be used to provide a utilitarian enclosure as well as an enclosure that has added visual appeal.

Figure 3:
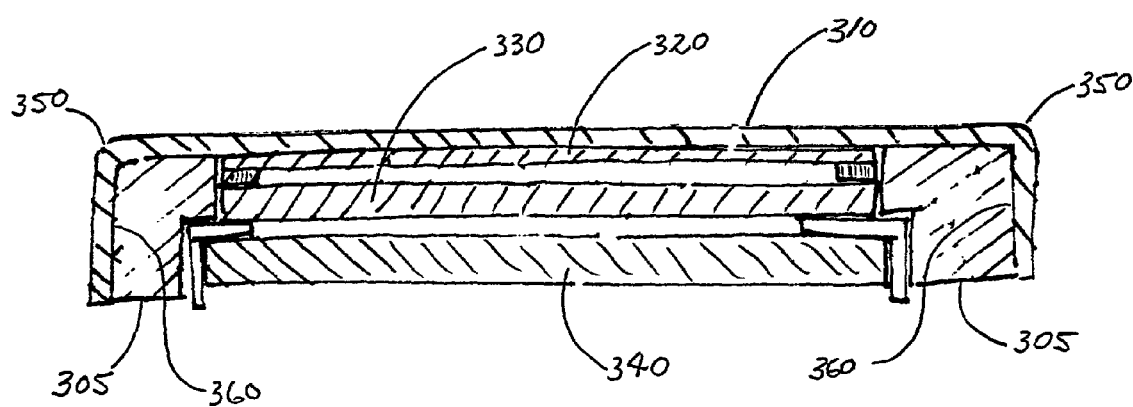
FIG. 3 is a cross-sectional view of an integrated enclosure/touch screen assembly constructed using in mold decoration to form a single cover piece according to an embodiment of the present invention.

FIG. 3 is a cross-sectional view of an embodiment 300 showing an integrated enclosure/touch screen assembly in a fabricated position in accordance with an embodiment of the present invention wherein a single cover piece 310 is used as the enclosure. The cover piece 310 is fused to the film layer 320 providing mechanical transfer between the two layers (310 and 320). In other words, the two layers (310 and 320) act as one physical layer. The two layers (310 and 320) can be affixed, adheased, fused, adhered, etc., together such that mechanical transfer occurs between the two layers. The cover piece 310 can be made, in one implementation, of mylar polycarbonate material.

The touch screen assembly is composed of an upper protective film 320 which is coupled directly to the inner surface of the cover piece. The digitizing element 330 is held in place slightly below the upper protective film. The digitizing element 330 is resistive having a small gap between film 320 as is well known. The display element 340 is then located just below the digitizing element. These three structures, the upper protective film, the digitizing element and the display element, together form the touch screen assembly.

The supporting structure 305 then holds the touch screen assembly in place and is the framework to which the single cover piece is attached. In this embodiment, the outer edges 350 of the cover piece have been produced with a rounded shape by means of the in mold decoration process. The inner surface of the cover piece is then coupled to the outer surface of the support structure 305 to provide a secure moisture and dust free environment for the touch screen assembly.

Figure 4:
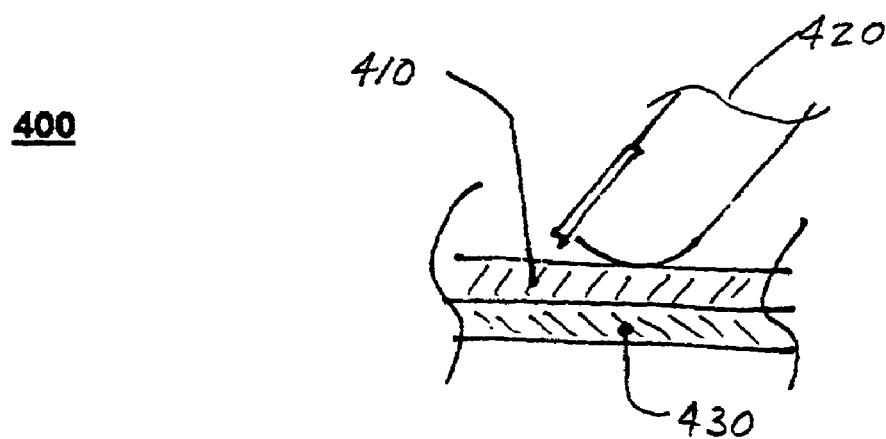
FIG. 4a illustrates the mechanical operation of an integrated enclosure/touch screen assembly constructed using in mold decoration to form a single cover piece by means of finger pressure according to an embodiment of the present invention.
FIG. 4b illustrates the mechanical operation of an integrated enclosure/touch screen assembly constructed using in mold decoration to form a single cover piece by means of stylus pressure according to an embodiment of the present invention.
Figure 4:
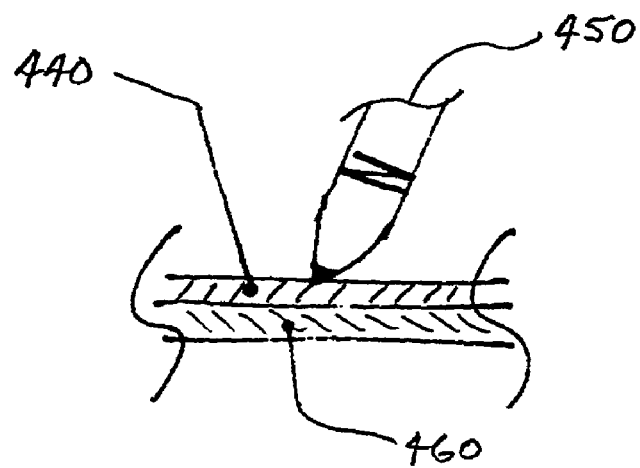

FIG. 4a illustrates the mechanical operation of an integrated enclosure/touch screen assembly 400 by means of finger (or stylus) pressure according to an embodiment of the present invention. The single cover piece enclosure 410 is coupled (e.g., fused, affixed, adhered, etc.) directly to the upper protective film 430 of the enclosed touch screen assembly. The cover piece enclosure coupled to the upper protective film remains flexible enough to bend slightly. The application of a force on the external surface of the single cover piece enclosure may then be used to deflect the upper protective film in a downward direction. The finger 420 shown in this illustration is exerting a downward pressure on the surface of the cover piece enclosure with sufficient force to cause activation of the below mounted digitizer mechanism.

FIG. 4b illustrates the mechanical operation of an integrated enclosure/touch screen assembly 400 by means of finger (or stylus) pressure according to an embodiment of the present invention. The single cover piece enclosure 440 is coupled directly to the upper protective film 460 of the enclosed touch screen assembly. The cover piece enclosure coupled to the upper protective film remains flexible enough to bend slightly. The application of a force on the external surface of the single cover piece enclosure may then be used to deflect the upper protective film in a downward direction. The stylus 450 shown in this illustration is exerting a downward pressure on the surface of the cover piece enclosure with sufficient force to cause activation of the below mounted digitizer mechanism.

Figure 5:
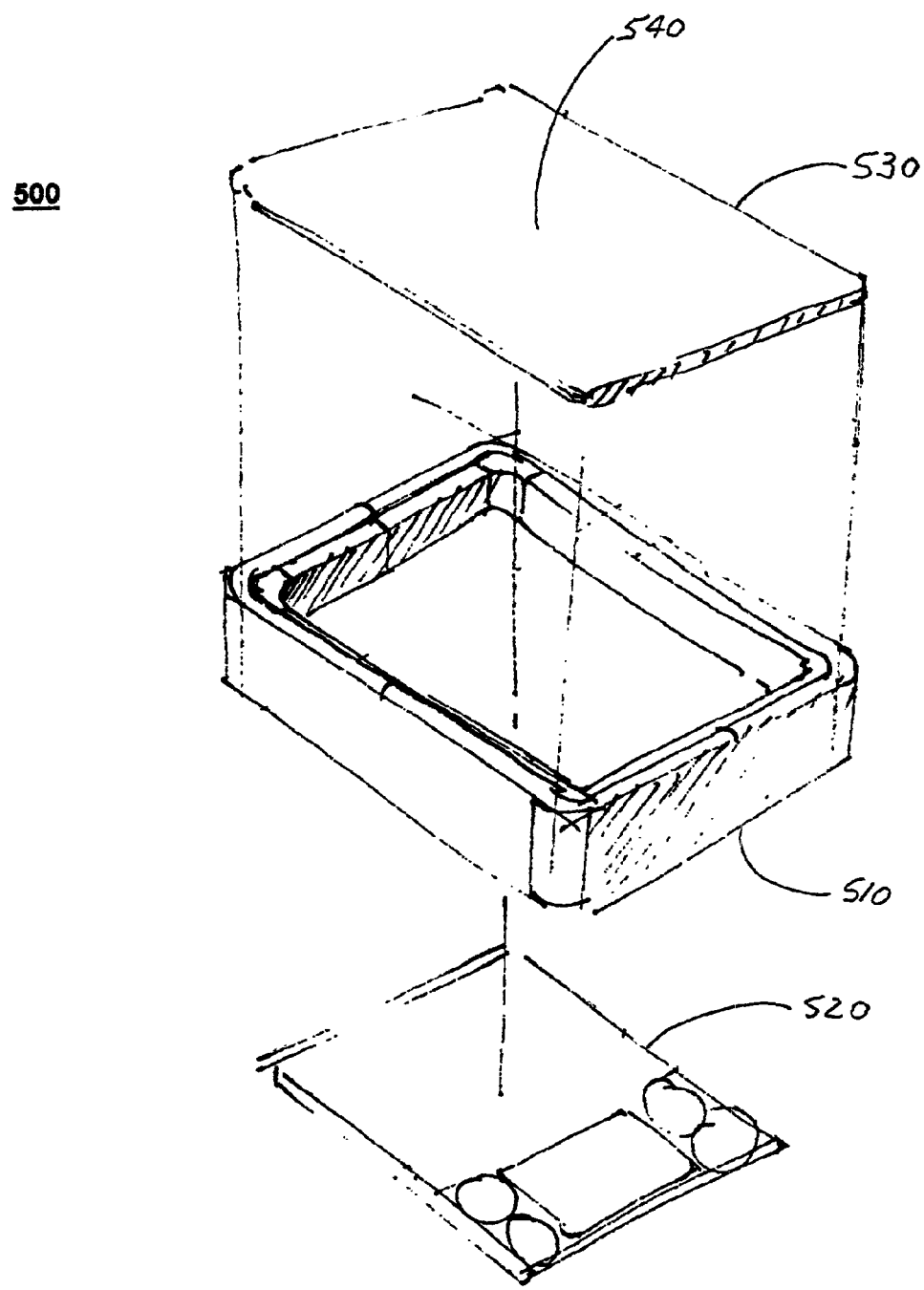
FIG. 5 illustrates an integrated enclosure/touch screen assembly constructed by coupling a single piece cover directly to a supporting structure according to an embodiment of the present invention.

FIG. 5 is an embodiment 500 showing an exploded view of an integrated enclosure/touch screen assembly constructed by coupling a single cover piece 530 directly to a supporting structure 510. The touch screen assembly 520 is enclosed within and held in place by the supporting structure. The cover piece consists of a soft thermoplastic polycarbonate material and the upper surface 540 can be made quite thin in order to reduce opacity. The resulting upper surface of the enclosure is flat and has no steps or indentations. The touch screen assembly fits entirely within the cover piece and the support structure, and the top surface of the touch screen assembly is then coupled to the inner portion of the upper surface of the cover piece. The resulting enclosure then provides a secure moisture and dust free environment for the touch screen assembly.

Figure 6:
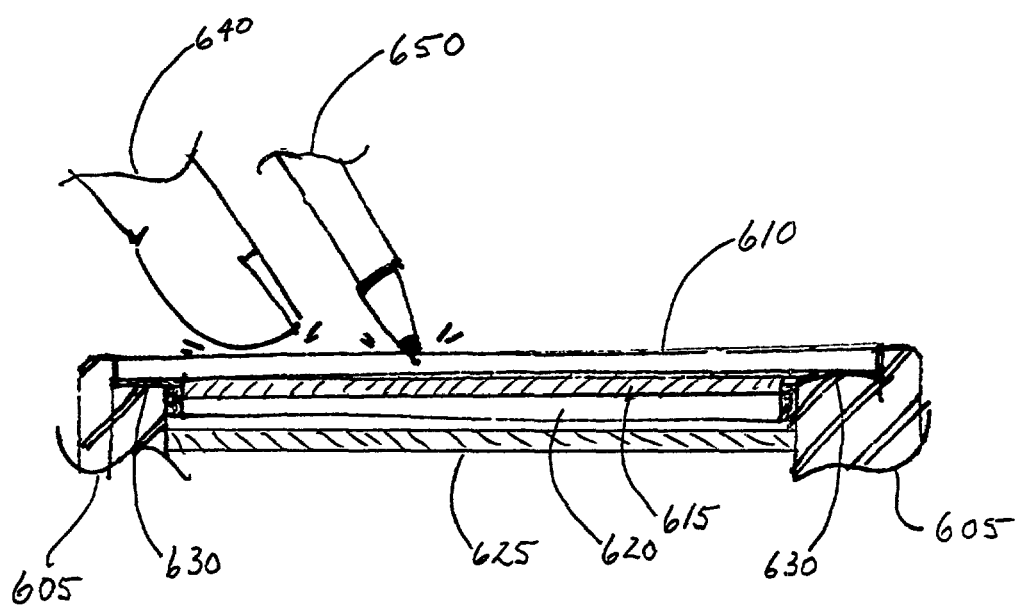
FIG. 6 is a cross-sectional view of an integrated enclosure/touch screen assembly constructed by coupling together a single piece cover directly to a supporting structure that illustrates mechanical activation by either finger pressure or stylus pressure according to an embodiment of the present invention.

FIG. 6 is a cross-sectional view of an embodiment 600 showing an integrated enclosure/touch screen assembly in a fabricated position wherein a single cover piece 610 is coupled directly to a supporting structure 605. The touch screen assembly is composed of an upper protective film 615 which is coupled directly to the inner surface of the cover piece. The digitizing element 620 is held in place slightly below the upper protective film. The display element 625 is then located just below the digitizing element. These three structures, the upper protective film, the digitizing element and the display element, together form the touch screen assembly.

The supporting structure 605 then holds the touch screen assembly in place and is the framework to which the single cover piece is attached. The inner surface of the cover piece is then coupled to the outer surface of the support structure 630 to provide a secure moisture and dust free environment for the touch screen assembly.

The cover piece coupled to the upper protective film remains flexible enough to bend slightly. The application of a force on the external surface of the single cover piece may then be used to deflect the upper protective film in a downward direction. The finger 640 shown in this illustration is exerting a downward pressure on the surface of the cover piece enclosure with sufficient force to cause activation of the below mounted digitizer mechanism. In a similar manner, the stylus 650 shown in this illustration is exerting a downward pressure on the surface of the cover piece enclosure with sufficient force to cause activation of the below mounted digitizer mechanism.

It is to be appreciated that there are a number of different digitizer mechanisms suitable for use in the embodiments of this invention, including but not limited to resistive, electromagnetic and capacitive type digitizers.

The preferred embodiment of the present invention, an integrated enclosure/touch screen assembly, is thus described. While the present invention has been described in particular embodiments, it should be appreciated that the present invention should not be construed as limited by such embodiments, but rather construed according to the below claims.

What is claimed is:

1. A display assembly for a portable electronic device comprising:
    a flat panel display screen;
    flat panel, clear, digitizer mechanism disposed over said flat panel display screen; and
    a bezel-less cover element disposed over a top surface of said digitizer mechanism that has a top surface that is coincident with the top surface of a supporting structure of said bezel-less cover element wherein said bezel-less cover element and said top surface of said digitizer mechanism are coupled and wherein contact made along said top surface of said bezel-less cover element activates said digitizer mechanism.

2. A display assembly as described in claim 1 wherein said cover is constructed using in mold decoration process.

3. A display assembly as described in claim 1 wherein said digitizer mechanism is a resistive type digitizing element.

4. A display assembly as described in claim 1 wherein said cover is a soft thermoplastic outer film that is coupled to said protective component of said digitizer mechanism.

5. A display assembly as described in claim 4 wherein said soft thermoplastic film has sufficient deflection under external pressure to activate said digitizer mechanism.

* * * * *

UNITED STATES PATENT AND TRADEMARK OFFICE
CERTIFICATE OF CORRECTION

| | | |
|---|---|---|
| PATENT NO. | : 8,384,674 B1 | Page 1 of 1 |
| APPLICATION NO. | : 09/774990 | |
| DATED | : February 26, 2013 | |
| INVENTOR(S) | : Anna Pia Slothower et al. | |

It is certified that error appears in the above-identified patent and that said Letters Patent is hereby corrected as shown below:

On the Title Page, in Item (75), Inventors, in column 1, line 3, delete "Hanson," and insert -- Hansen, --, therefor.

On the Title Page, in Item (57), Abstract, in column 2, lines 10-25, after "free and waterproof." delete "The soft thermoplastic material used for the single piece cover will allow activation of the digitizer mechanism by means of mechanical pressure applied to the outer surface of the single piece cover. In one embodiment, the single piece cover is constructed by coupling a soft thermoplastic outer film directly to the top film of the digitizer mechanism by an in mold decoration process. This process forms the flat outer surface for the single piece cover and also may be used to provide various shapes for the outer edges of the cover. In a second embodiment, a touch screen assembly consisting of a display mechanism and a digitizer mechanism are enclosed within a mechanical support mechanism. A soft thermoplastic film is then coupled directly to the top film of the digitizer mechanism and the support mechanism to form a flat outer surface for the entire enclosure that is free of any steps or indentations.".

In the Drawings

In sheet 1 of 6, line 4, above "FIGURE 1" insert -- Prior Art --.

Signed and Sealed this
Ninth Day of September, 2014

Michelle K. Lee
*Deputy Director of the United States Patent and Trademark Office*